July 6, 1948.  J. F. PETERS  2,444,465
METHOD AND MACHINE FOR MAKING CAN BODIES
Filed July 11, 1945  6 Sheets-Sheet 4
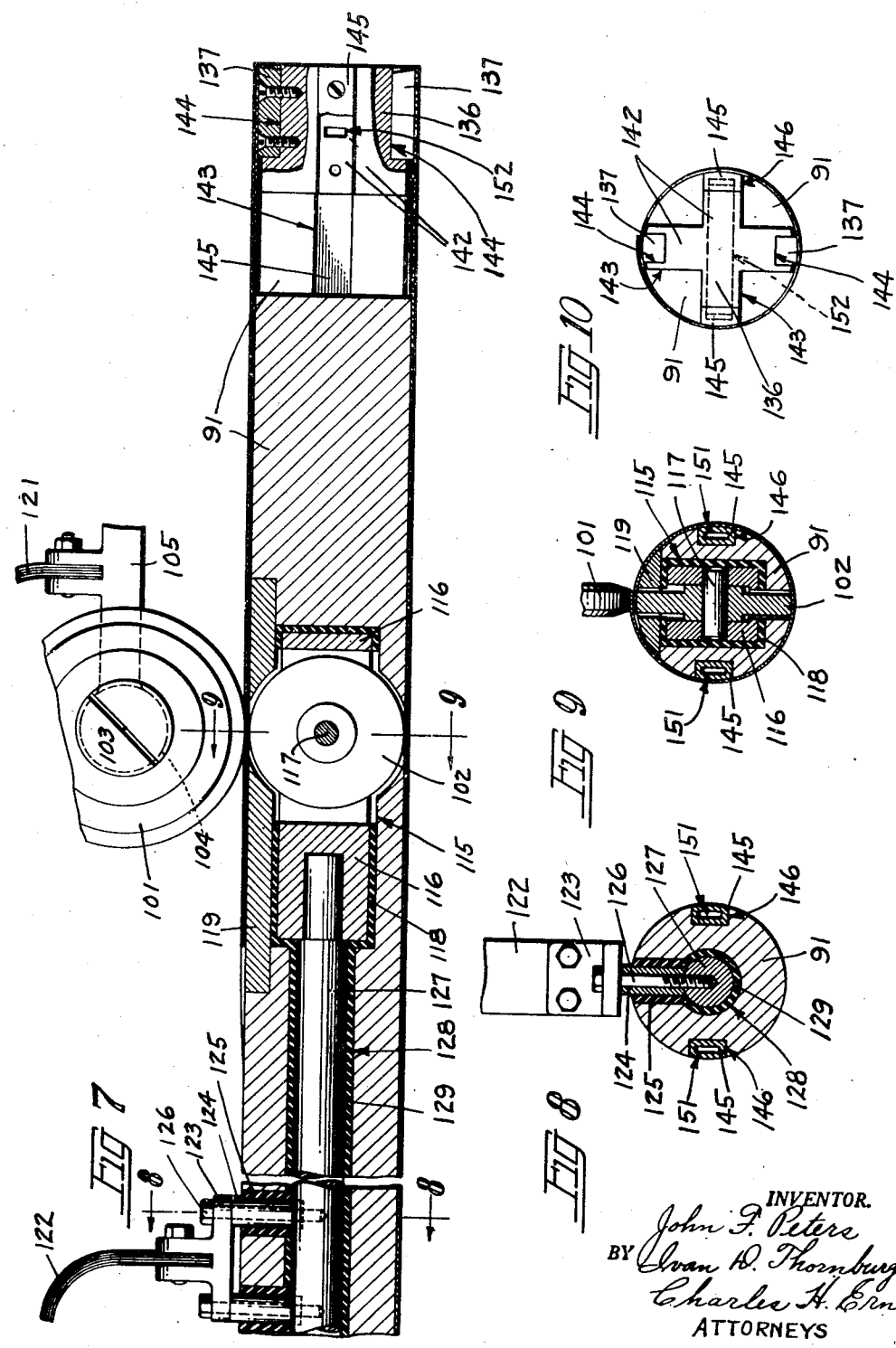
INVENTOR.
John F. Peters
BY Ivan D. Thornburgh
Charles H. Erne
ATTORNEYS

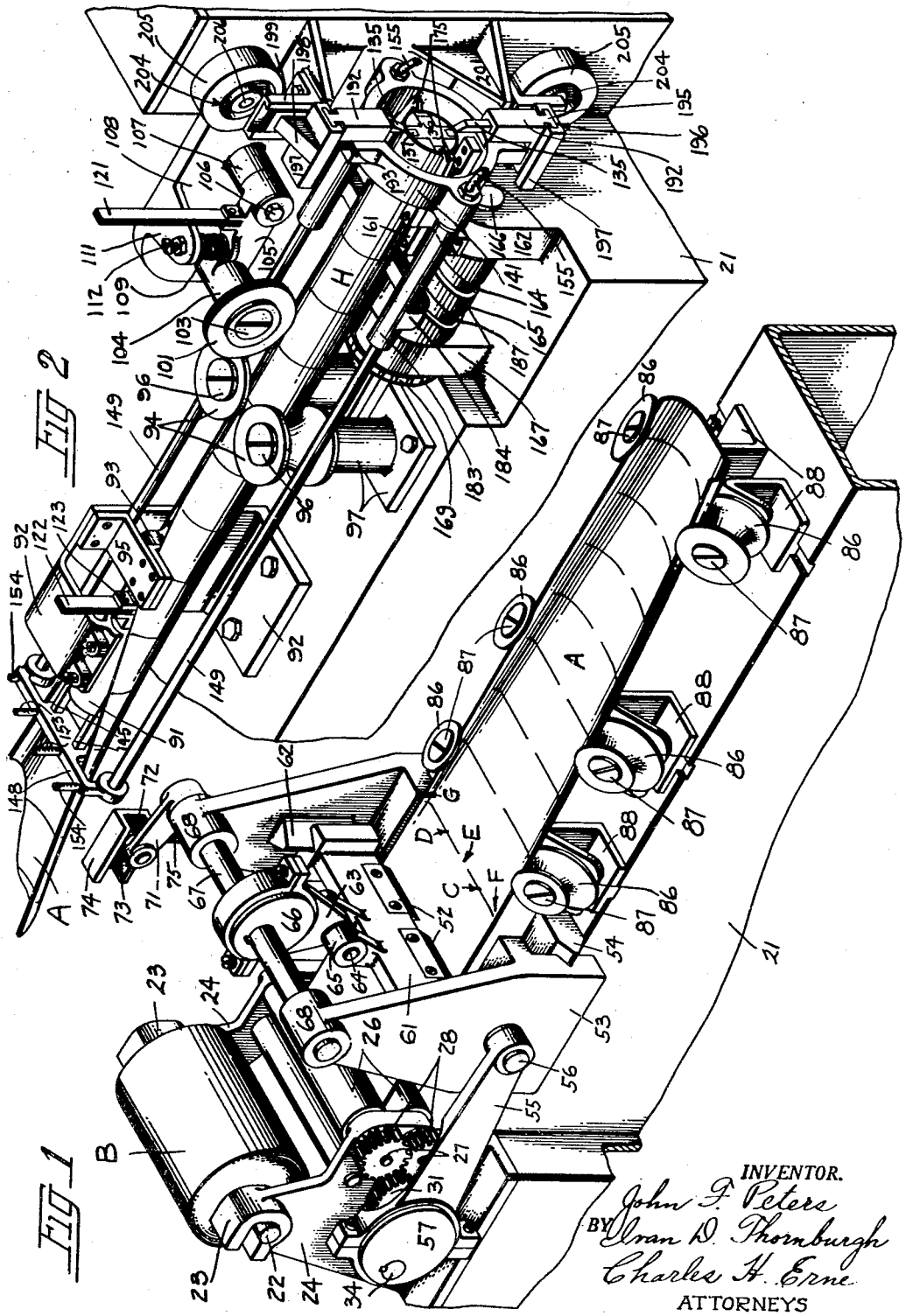

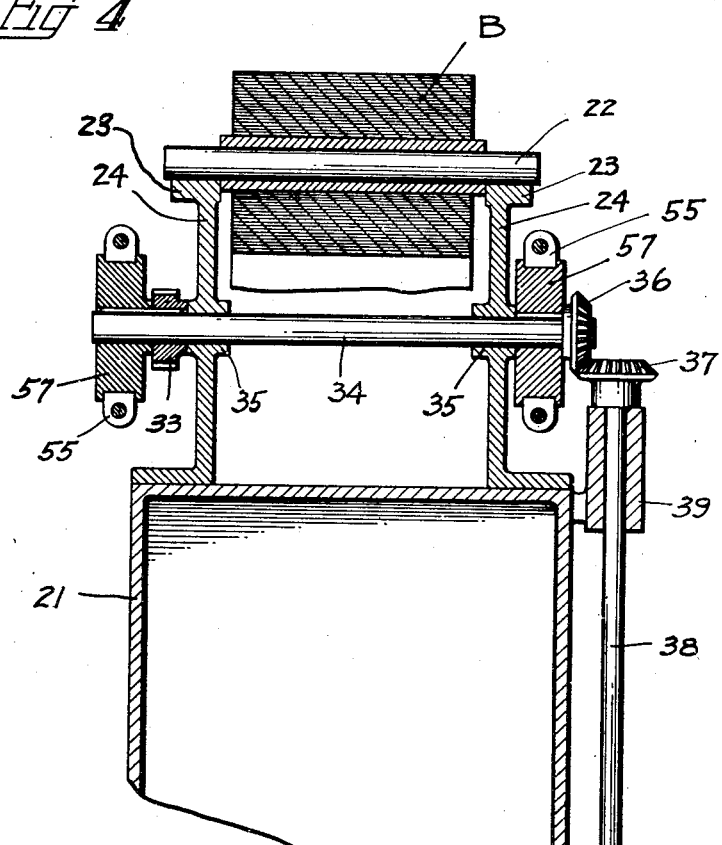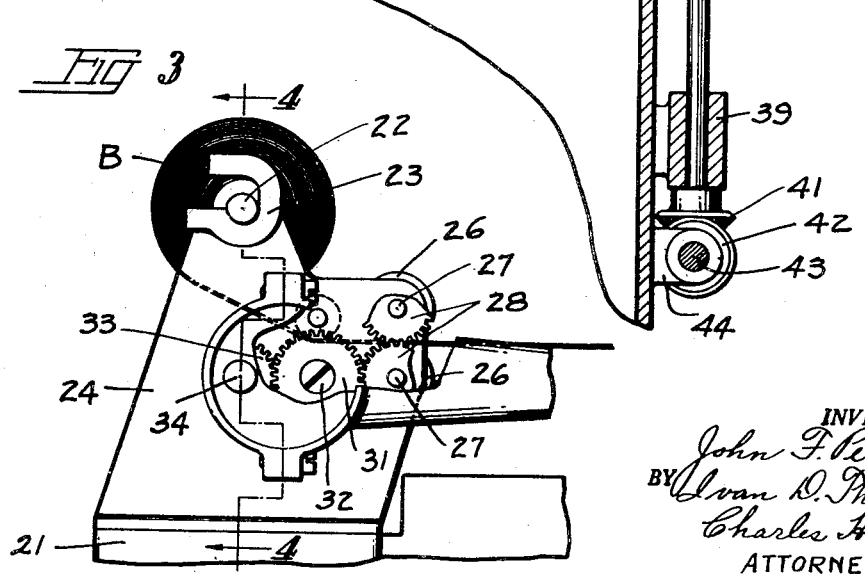

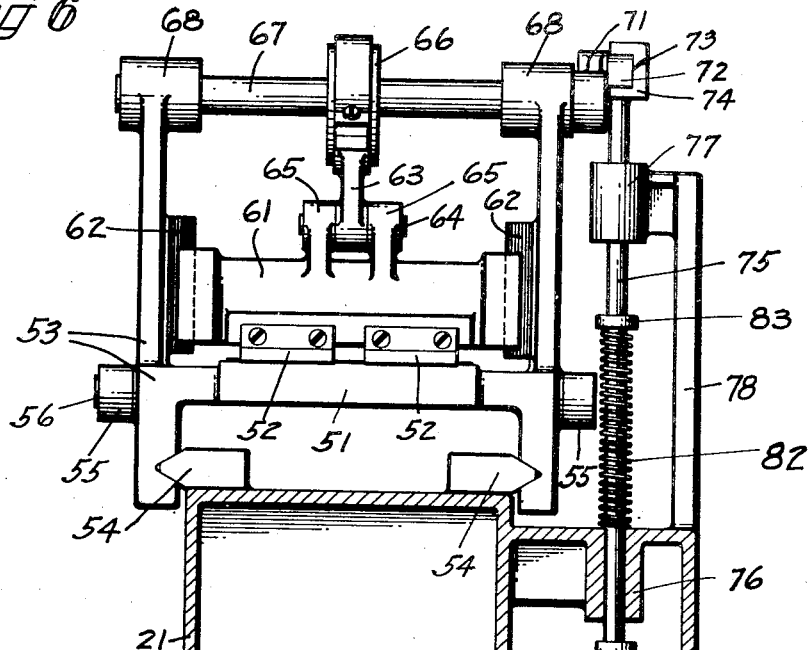
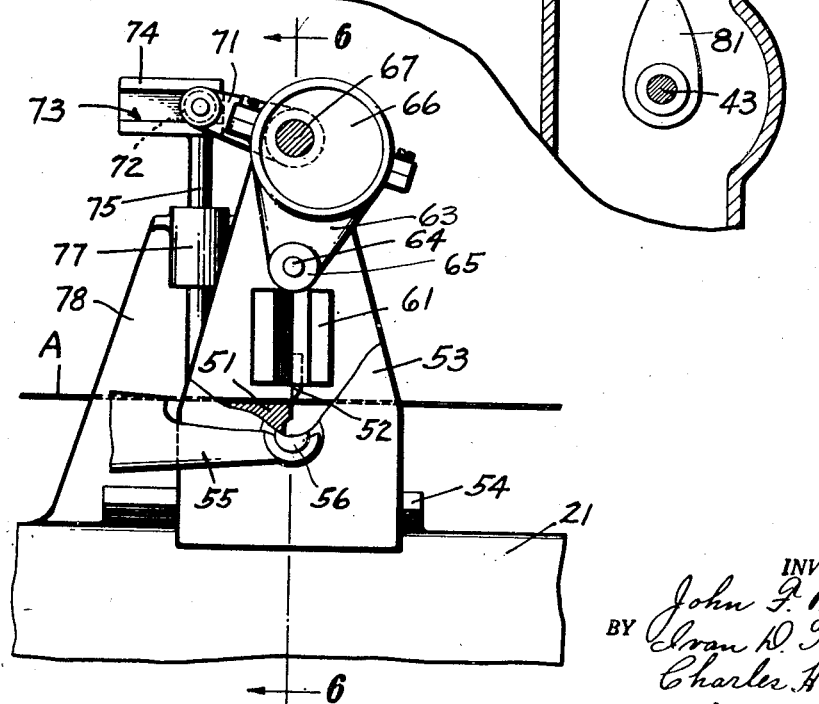

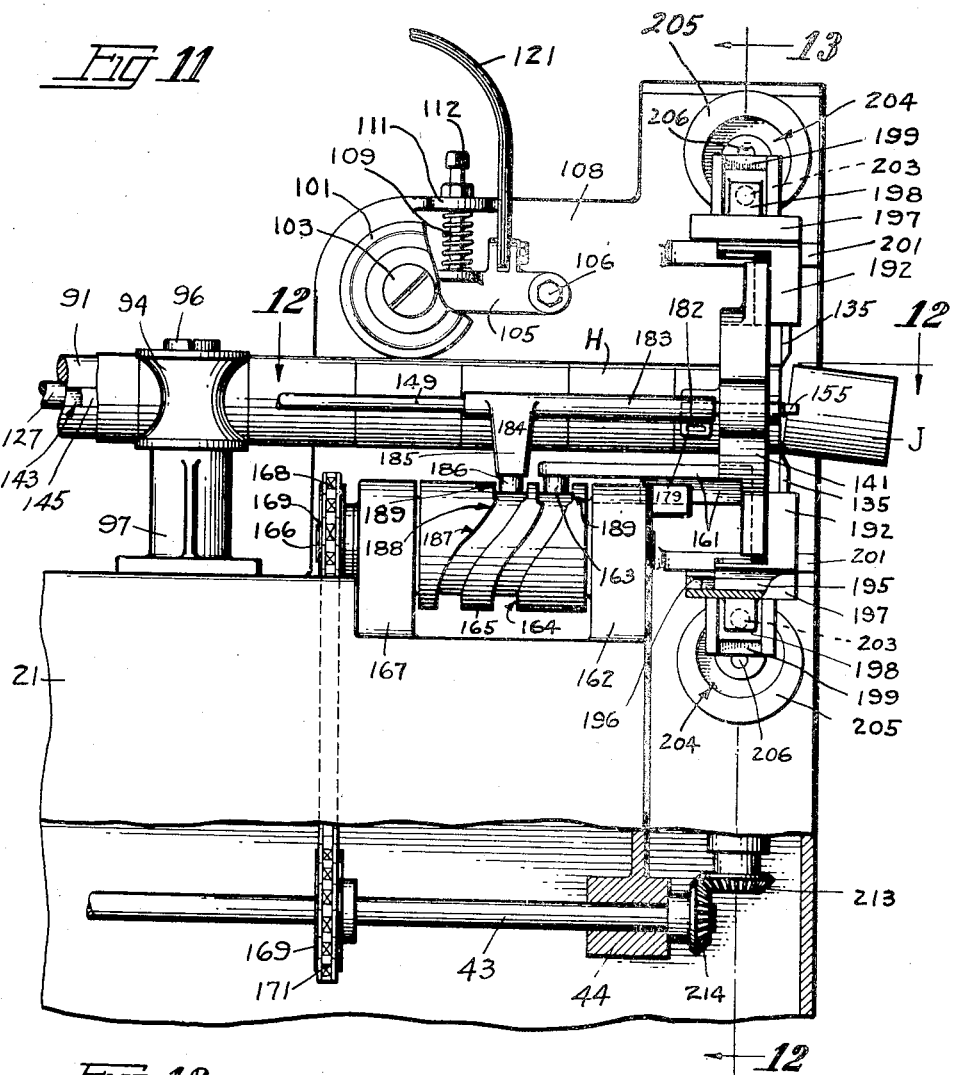

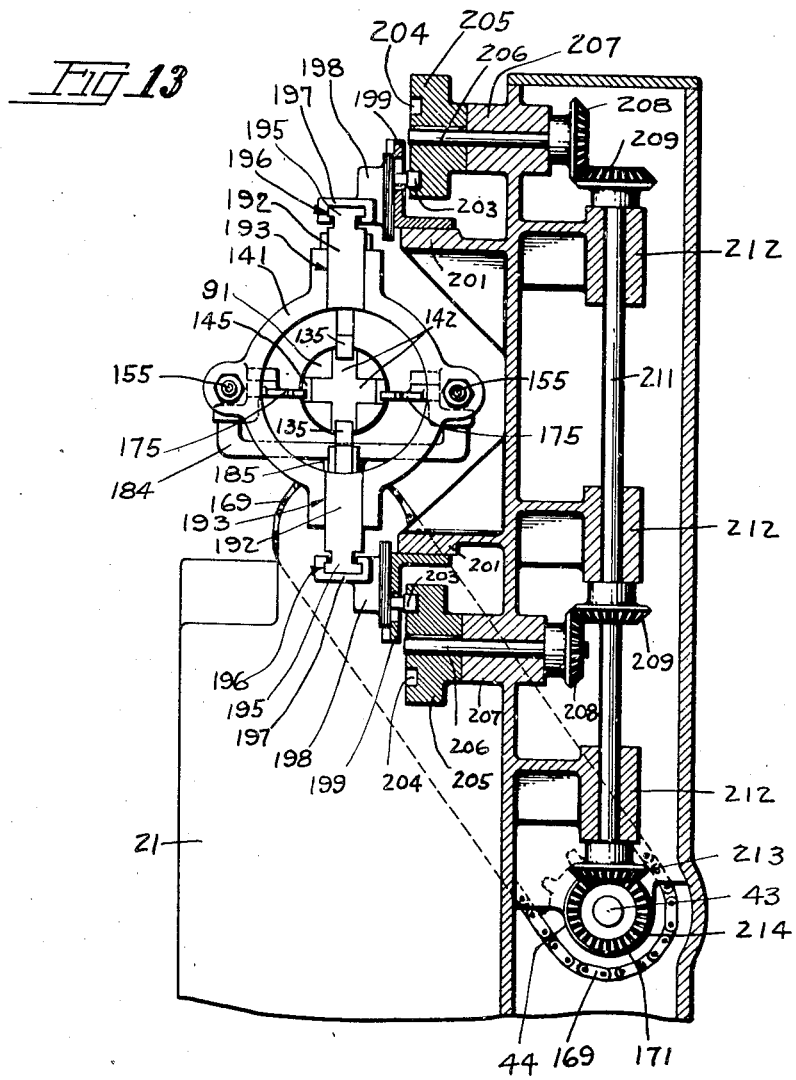

Patented July 6, 1948

2,444,465

UNITED STATES PATENT OFFICE 2,444,465

METHOD AND MACHINE FOR MAKING CAN BODIES

John F. Peters, Leonia, N. J., assignor to American Can Company, New York, N. Y., a corporation of New Jersey Application July 11, 1945, Serial No. 604,396

7 Claims. (Cl. 113—120)

The present invention relates to a method and machine for making can bodies from a strip of sheet material adapted to be formed into a tube and has particular reference to facilitating the division of the tube into a plurality of individual and separated can bodies.

The invention contemplates a method and means for partially dividing a moving metallic strip transversely thereof at longitudinally spaced intervals each of desired can body length, prior to forming the strip into a continuously moving open tube, preparatory to completely severing or dividing such tube into a plurality of such individual separated can bodies. This is an improvement over United States Patent No. 2,177,104 issued October 24, 1939, to B. W. Gonser, for Method of manufacturing can bodies.

In the manufacture of can bodies from strip material in which the strip is first formed into a tube it has been found that some difficulty has been experienced in subsequently dividing the tube into can body lengths. The instant invention contemplates overcoming the difficulty by the provision of devices which first partially cut or otherwise partially divide the strip transversely thereof at spaced intervals along the strip in accordance with the desired length of the can bodies to be produced and which then sever the tube, formed from the strip, at the places where the strip has been precut to divide the tube into a plurality of can bodies at a high speed rate of production.

An object of the invention is the provision in a method and machine for making can bodies from a strip of sheet material formed into tubular form, of devices for dividing the strip and the tube, wherein the strip prior to being formed into a tube is precut or partially divided along lines extending transversely of the strip to facilitate subsequent division of the tube into a plurality of individual and separated can bodies.

Another object is the provision of such devices in a method and machine for making can bodies from a strip of sheet material wherein clean cut edges may be obtained at the ends of the resulting can bodies so that burrs and the like, which ordinarily interfere with the subsequent securing of closure members to the bodies, will be eliminated.

Another object is the provision in a method and machine of this character, of cut off devices wherein the resulting tube formed from the precut strip of sheet material is divided into a plurality of individual and separated can bodies by a cutting through of short uncut portions located at the ends of the precut lines extending transversely of the strip.

Another object is the provision of such devices which operate continuously as the strip of sheet material is continuously and progressively fed through the machine so that the forming of the tube and the dividing of the tube into individual and separated can bodies may proceed at a high speed rate of production in which continuous welding of the side seam of the tube may be had when the strip is made of metal or metallic material.

Another object is the provision in such a machine of gauging devices wherein cutting devices are gauged as the tube is progressively fed through the machine to properly locate the precut lines of the tube relative to the cutting devices so that a clean cut edge for the end of a cut off can body is obtained when the tube is divided into individual and separated can bodies.

Numerous other objects and advantages of the invention will be apparent as it is better understood from the following description, which, taken in connection with the accompanying drawings, discloses a preferred embodiment thereof.

Referring to the drawings:

Figures 1 and 2 are continuing perspective views of a machine embodying the instant invention, the views showing a strip of material in place and in various stages of being converted into can bodies;

Fig. 3 is an enlarged side elevation of the strip entrance or feed-in end of the machine, with parts broken away;

Fig. 4 is a transverse section taken substantially along the broken line 4—4 in Fig. 3, with parts broken away;

Fig. 5 is an enlarged side elevation of the strip pre-cutting portion of the machine, with parts broken away and parts shown in section;

Fig. 6 is a transverse section taken substantially along the line 6—6 in Fig. 5, with parts broken away;

Fig. 7 is an enlarged longitudinal section of a tube supporting horn and welding devices used in the machine, with parts broken away;

Figs. 8 and 9 are transverse sections taken substantially along the respective lines 8—8, 9—9 in Fig. 7, with parts broken away;

Fig. 10 is an end elevation of the horn shown in Fig. 7 with parts broken away;

Fig. 11 is an enlarged side elevation of the discharge end of the machine, with parts broken away and parts shown in section;

Fig. 12 is a view taken substantially along a plane indicated by the line 12—12 in Fig. 11, with parts broken away; and Fig. 13 is a transverse section taken substantially along the line 13—13 in Fig. 11, with parts broken away.

As a preferred embodiment of the invention the drawings illustrate a continuous operation machine for making sheet metal tubular can bodies from a strip A of sheet material such as tin plate or the like of a length sufficient to form a plurality of the bodies and of a width approximately the circumference of a body. Such a strip preferably is handled in the form of a roll or coil B.

In the machine the strip A is unrolled from the coil B and is continuously fed along a straight line path of travel through the machine. During this travel the moving strip is first pre-cut or partially divided at spaced intervals along its length by producing in the strip pairs of co-extensive slits C, D extending transversely of the strip. These slits set off in the strip a series of connected potential can bodies of a desired length.

The slits C, D extend in a straight lines across the strip and are separate or unconnected. The inner ends of the slits terminate in spaced relation near the middle of the strip and thus set off a separating uncut portion E as best shown in Fig. 1. The outer ends of the two slits terminate just short of the outer longitudinal edges of the strip and thus set off short uncut edge portions F, G located one along each edge of the strip. These uncut portions E, F, G hold the partially divided strip together as a unitary structure for further advancement.

The partially divided strip as it progresses through the machine is flexed or rolled inwardly into a tubular form extending longitudinally of its path of travel and its outer edges are brought into adjacent position over-lapping each other for securing together. The overlapped edges preferably are welded together while the strip advances and thus a long tubular member H is produced having a welded side seam which includes the uncut portions F, G of the tube. This tube still contains the potential can bodies set off by the now circumferential slits C, D and still connected by the uncut portions E, F, G.

As the partially divided tubular member H moves along its path of travel, its circumferential slits C, D are gauged for proper location of the tube and simultaneously the uncut portions E, F, G are cut through to separate the tube into individual separated can bodies J (Fig. 11). These can bodies are discharged to any suitable place of deposit.

In such a manner, the pre-cutting or partial dividing of the strip produces clean cut terminal edges for the can bodies and makes it possible to separate the bodies from the tubular member produced from the strip, at high speed rates of production and while the tubular member is advancing along its path of travel.

The machine includes a long frame 21 (Figs. 1 and 2) on which the various parts are supported. The coil B of sheet material A is disposed at one end of the frame and is mounted on an axle 22 (see also Figs. 3 and 4) the ends of which are loosely carried in open bearings 23 formed in upright brackets 24 secured to the frame.

The strip A as it is unrolled from the coil B travels longitudinally of the frame 21. This unrolling and continuous feeding of the strip is effected preferably by a pair of feed rollers 26 between which the strip A is threaded. The feed rollers are formed with trunnions 27 which are journaled in bearings formed in the upright brackets 24. The rollers are continuously rotated in unison by meshing gears 28 mounted on the trunnions 27.

Gears 28 are driven by an idler gear 31 which meshes with one of the gears 28. The idler gear is mounted on a stud shaft 32 (Fig. 3) threadedly secured in one of the brackets 24. This gear meshes with and is driven by a gear 33 carried on an eccentric carrying shaft 34 which extends transversely of the machine and which is journaled in bearings 35 (Fig. 4) formed in the brackets 24. One end of this shaft carries a bevel gear 36 which meshes with a similar gear 37 mounted on the upper end of a vertically disposed auxiliary drive shaft 38.

The auxiliary drive shaft 38 is journaled in bearings 39 formed on the main frame 21. The lower end of the shaft carries a bevel gear 41 which meshes with and is driven by a bevel gear 42 mounted on a horizontally disposed main drive shaft 43 (Figs. 4, 6, 11 and 13). This main drive shaft extends the full length of the frame 21 and is journaled in a plurality of bearings 44 formed on the frame at spaced intervals therealong. The main drive shaft is continuously rotated in any suitable manner.

Pre-cutting or partially dividing the strip A to produce the transverse slits C, D while the strip is advancing is brought about preferably by a traveling cutting die which includes a lower shear block 51 (Figs. 5 and 6) and a pair of upper knives or shear blades 52 (see also Fig. 1). The lower shear block 51 is mounted on a horizontally reciprocable slide bracket 53 which slides along beveled ways 54 formed on the frame 21.

The slide bracket 53 is reciprocated along the ways 54 through a forward or cutting stroke and thence through a return stroke in time with the lineal travel of the strip A, at the same lineal speed and for a distance substantially equal to the length of one potential can body so that the spacing of the slits C, D will be equal to the length of one can body. This movement of the bracket is effected preferably by eccentric arms 55. There are two eccentric arms, one on each side of the slide bracket and they are pivotally connected by way of pivot pins 56 to the bracket. The opposite ends of the arms are mounted on and operate over eccentric discs 57 carried on the eccentric shaft 34 (see also Fig. 4).

While the slide bracket 53 is traveling with the strip A, the upper shear blades 52 are reciprocated vertically to produce the slits C, D in the strip at the proper place. This cutting of the strip takes place on the forward stroke of the slide bracket while it is moving at the same speed as the strip. There are two shear blades 52 arranged in transverse alignment with the moving strip and in spaced relation (as best shown in Figs. 1 and 6) and they are secured in a vertically movable head 61 the outer ends of which operate in vertical beveled ways 62 formed on the slide bracket 53.

The head 61 is vertically reciprocated in time with the travel of the slide bracket by way of a vertically disposed eccentric arm 63 the lower end of which is mounted on a pivot pin 64 carried in a pair of spaced lugs 65 which project up from the head. The upper end of the eccentric arm 63 surrounds and operates over an eccentric disc 66 mounted on a rocker shaft 67 which extends transversely of the slide bracket 53 and which is carried in bearings 68 formed on the slide bracket.

The rocker shaft 67 is oscillated in its bearings to actuate the eccentric arm 63 by a lever 71 which is mounted on one end of the rocker shaft. The outer end of the lever carries a roller 72 which operates in a straight line groove 73 formed in a channel shaped actuating member 74. This member is mounted on the upper end of a vertically disposed actuating rod 75 (Fig. 6) carried in a bearing 76 formed in the frame 21 and in a bearing 77 formed in an upright bracket 78 which extends up from the frame. The lower end of the actuating rod carries a cam roller 79 which operates on the periphery of an edge cam 81 mounted on the main drive shaft 43. A compression spring 82 surrounding the actuating rod and interposed between the lower bearing 76 and a collar 83 secured to the rod keeps the cam roller in engagement with the cam 81.

Hence as the cam 81 rotates with the main drive shaft 43 it raises and lowers the actuating rod 75 and the actuating member 74 secured to its upper end, in time with the horizontal reciprocation of the slide bracket 53 and the moving strip A of sheet material. This movement of the actuating member rocks the actuating lever 71 and thus rocks the rocker shaft 67. Through the roller connection between the lever 71 and the actuating member 74 this rocking of the rocker shaft is readily effected without interfering with the reciprocation of the slide bracket 53. It is through this oscillation of the rocker shaft that the cutter head 61 is vertically reciprocated.

The timing of the vertical reciprocation of the cutter head 61 relative to the movement of the slide bracket 53 is such that the upper shear blades 52 engage against, cut through and withdraw from the moving strip A of material on the forward stroke of the slide bracket. The slide bracket is moving at the same lineal speed as the advancing strip. Hence there is no lineal movement between the shear blades and the strip and thus the cutting takes place without any interference between the blades and the strip and while the strip is moving continuously at a high rate of speed.

The flexing or bending of the strip A longitudinally into tubular form is done preferably by a plurality of shaped forming rollers 86 (Fig. 1) which are disposed adjacent the path of travel of the strip A and which engage against both of the opposite longitudinal outer edges of the moving strip. These rollers are freely rotatable on short inclined shafts 87 secured in stationary brackets 88 mounted on the frame 21.

As the strip continuously advances past the forming rollers it is gradually and progressively flexed or bent from a flat condition into a cylindrical or tubular form to produce the tubular member H hereinbefore mentioned. During the final stages of this tube forming operation the formed strip passes onto a horizontal mandrel or horn 91 (Fig. 2) which extends longitudinally of the frame 21. The horn is supported at its inner end from a bracket 92 which is bolted to the frame. The tubular member H, still connected with the strip A is progressively and continuously advanced along the horn by the feed rollers 26 disposed at the feed-in end of the machine.

During the advancement of the tubular member H along the horn 91, its longitudinal edges are brought into overlapping relation adjacent each other by a stationary angular forwardly projecting tapered guide finger 93 (Fig. 2) and a pair of guide rollers 94 which are located one on each side of the horn. The guide finger 93 is spaced slightly above the horn 91 and is secured to an angle plate 95 bolted to the bracket 92. One edge of the strip passes under this finger and the other edge passes in abutting engagement against one side of the finger in order to form the lap as the formed strip passes onto the horn.

Each guide roller 94 is formed with a curved or concave profile to fit against and almost entirely surround the horn 91 (see Fig. 11) so as to bend the partially formed strip into a true cylindrical shape and to thereby retain the edges of the strip in their overlapped relation. These rollers also support the horn intermediate its length. The rollers are freely mounted on short vertical studs 96 which are carried in brackets 97 bolted to the frame 21.

The overlapped edges of the tubular member H are immediately secured together by welding as hereinbefore mentioned. This is effected by electric welding devices which are located adjacent the guide rollers 94. These welding devices include an outside rotatable disc electrode 101 located in a vertical position just above the horn 91 so that its outer periphery engages against and rolls by frictional contact on the overlapped edges of the tubular member H. This electrode is freely mounted on a short stub shaft 103 carried in a boss 104 formed on the outer end of a supporting arm 105.

The arm 105 is mounted on a pivot stud 106 secured in a boss 107 formed on an upright web 108 (see also Fig. 11) of the frame 21. A compression spring 109 interposed between the arm 105 and a lug 111 formed on the web 108 exerts a pressure on the welding electrode 101 and thus keeps it in engagement with the overlapped edges of the tubular member H. A setscrew 112 threadedly engaged in the lug is provided for adjustment of the electrode.

The inside electrode 102 is located in a recess 115 (Figs. 7 and 9) formed in the horn 91 and is disposed directly under the outside electrode 101. This inside electrode is held in a retainer yoke 116 and is freely mounted on a pin 117 secured in the yoke. The yoke is located in the horn recess 115 and is insulated from the horn by insulating material 118 interposed between the yoke and the horn. A cover plate 119 holds the yoke in place.

Electric energy from any suitable source is continuously supplied to the outside and inside electrodes 101, 102 by way of bus bars 121, 122 (Fig. 7). The bus bar 121 is connected directly to the outside electrode supporting arm 105. The bus bar 122 for the inside electrode is connected to a bracket 123 which is located adjacent the inner end of the horn so as to clear the strip A of material as the latter is wrapped around the horn. This bracket is provided with depending spacer sleeves 124 which extend down through insulating bushings 125 carried in bores formed in the horn 91.

The sleeves 124 are connected by way of long bolts 126 (see also Fig. 8) to a stationary bar 127 disposed in a horizontal bore 128 formed in the horn 91. This bar is insulated from the horn by a layer of surrounding insulating material 129. The inner end of the bar is secured in the retainer yoke 116 and thus conducts the electric energy from the bus bar 122 to the inside electrode 102.

Thus as the tubular member H continuously advances along the mandrel 91, the electrodes 101, 102 frictionally engage against the outer and inner surfaces of the overlapped edges of the tube and this rotates the electrodes while the electric energy continuously flows through them. This energy, passing from one electrode to the other, through the overlapped edges of the tube, welds the edges together in a continuous side seam for the potential can bodies. The uncut portions E, F, G of the tubular member H still provide the connection between such potential can bodies the side seam including the uncut portions F, G.

Immediately following this side seam welding operation and as the welded tube H continues to advance along the horn 91 toward its outer end, the tube is divided into the individual can bodies J. The dividing of the tube is brought about by a severing of the uncut portions E, F and G which, it will be recalled, are adjacent the slits C, D, the uncut portion E being located at the bottom of the horn and the side seam and its included uncut portions F, G being diametrically opposed and located on top of the horn.

This severing of the tube is effected in part, while the tube is moving, by a pair of oppositely disposed upper and lower shear blades or cutters 135 (Figs. 2, 11 and 13). These are located outside the horn 91 adjacent the discharge end thereof and at the time of cutting are in line with the uncut portions E, F and G. A shear head 136 (see Fig. 7) carrying a pair of oppositely disposed shear blocks 137 cooperates with the cutters 135, the shear blocks being located inside the tubular member H adjacent the end of the horn and in line with the cutters.

The shear blades or cutters 135 are movable in two directions, namely, longitudinally of the horn 91 along the path of travel of the moving tube H, and radially toward and away from the tube. For this purpose these blades are mounted in an annular housing or carriage 141 which surrounds the horn 91 and which is reciprocable along the path of travel of the tube on the horn.

The shear blocks 137 within the tube are movable in one direction only, i. e., longitudinally of the horn. Such a movement is in unison with the longitudinal movement of the shear blades 135 and is therefore in time with the movement of the tube. In order to bring about this cooperative movement between the shear blades and the shear blocks while maintaining them in proper alignment relative to each other for the shearing operation to be performed on the tube, these shear members are connected to the same parts and are actuated from a single source of power.

For this purpose the shear head 136 is formed in the shape of a cross having four outwardly projecting arms 142 (Figs. 7 and 10). Two of the opposed arms are horizontal and two are vertical. These arms slide in corresponding longitudinal slots 143 in the outer or discharge end of the horn 91.

The two shear blocks 137 are carried in suitable locating grooves 144 formed in the outer ends of the two vertical arms 142 of the shear head 136. The two horizontal arms 142 are shorter than the vertical arms and are secured at their ends to a pair of slide bars 145. These bars slide in longitudinal grooves 146 (Figs. 8 and 9) formed in opposite sides of the horn 91.

These slide bars also extend back along the horn (see Figs. 2 and 12) and project beyond the inner end of the horn. The inner ends of the bars thus clear the strip A as it moves into position around the horn. The inner ends of the bars 145 are secured in a bracket 148. This bracket is wide enough to bridge the path of travel of the strip A.

The bracket 148 at the two sides carries a pair of long rods 149 which are disposed outside of and parallel with the horn 91 and the tube H carried thereon. These rods 149 extend forwardly along the horn toward its discharge end and connect with the annular housing 141 which carries the shear blades 135. Through this connection the shear head 136 and housing 141 are tied together for movement in unison, as hereinbefore mentioned.

In order to maintain accurate alignment of the shear blocks 137 relative to the shear blades 135, the slide bars 145 and the long rods 149 are water cooled. For this purpose water is circulated through the parts subjected to heating. Therefore elongation due to unbalanced temperatures in the bars and in the rods will be prevented.

In the slide bars 145 the cooling medium is circulated through passageways 151 (see Figs. 8 and 9) formed in the bars and through a connecting passageway 152 (see Fig. 7) in the shear head 136. Inlet and outlet tubes 153 (Figs. 2 and 12) carried in the bracket 148 and connecting with the inner ends of the bars in the bracket, lead from any suitable source of the cooling medium and lead to a suitable place of discharge for the used water to complete the circulation system.

The long rods 149 are made hollow and the cooling medium is circulated through these rods by way of inlet tubes 154 and outlet tubes 155 (Figs. 2 and 12). The inlet tubes are secured in the bracket 148 and connect with the inner ends of the rods and lead from any suitable source of the cooling medium. The outlet tubes 155 are connected to the outer ends of the rods and lead to any suitable place of discharge for the used water.

Longitudinal reciprocation of the shear head 136 and the annular housing 141 along the path of travel of the tube H and in time with the travel of the tube, as hereinbefore mentioned, is brought about by cam action. For this purpose the housing is formed with a horizontal tongue 161 (Fig. 11) which extends rearwardly parallel with the horn 91 and which operates in a slideway formed in a bearing bracket 162 on the frame 21. This tongue also supports the housing. The inner end of the tongue carries a cam roller 163 which operates in a cam groove 164 of a barrel cam 165.

The barrel cam 165 is mounted on a rotatable shaft 166 which is journaled in the bearing bracket 162 and in a similar bracket 167 mounted on the machine frame. The shaft is continuously rotated through the medium of a sprocket 168 which is mounted on the shaft and which is driven by a chain 169 (see also Fig. 13). The chain operates over a drive sprocket 171 mounted on the main drive shaft 43.

Hence as the barrel cam 165 rotates, it reciprocates the annular housing 141 and the shear head 136 connected therewith. In a forward or cutting stroke the parts advance along the path of travel of the tube H on the horn 91. In their rearward movement the parts pass through a return stroke. On the cutting stroke the housing and shear head move at a lineal speed equal to that of the moving tube, with the shear blades 135 of the housing and the shear blocks 137 of the shear head in registry with the precut slits C, D in the tube.

During this forward stroke, while the tube H and the housing 141 and the shear head 136 are all advancing at the same rate of linear speed, the tube H is gauged for proper location of the slits C, D relative to the shear blades 135 and shear blocks 137. This is done to insure that the separation of the cam body J from the tube takes place exactly along the slits C, D. This gauging of the tube is brought about by a pair of gauging fingers 175 (Figs. 2, 12 and 13) which are disposed adjacent to and located one on each side of the horn 91.

The gauging fingers 175 are mounted on pivot pins 176 (Fig. 12) secured in lugs 177 which extend out from the annular housing 141 so the fingers can swing inwardly toward the moving tube H on the horn 91. The free or gauging end of each finger is formed with a gauging hook 178. The opposite end of each finger is formed with an actuating arm 179 having a longitudinal T slot 181. On each side of the horn a T-shaped button 182 (see also Fig. 11) is secured in a sleeve 183 which slides on one of the long rods 149.

There is one of these sleeves 183 for each long rod 149 and they are tied together by a transverse tie bar 184 for sliding movement along the rods in unison. The tie bar 184 is formed with a depending lug 185 (see Figs. 11 and 13) which carries a cam roller 186. The cam roller operates in a cam groove 187 formed in the barrel cam 165 adjacent the cam groove 164.

The cam groove 187 extends around the barrel cam 165 in parallelism with the groove 164 and in spaced relation thereto for the major part of its length except for one short section 188 where it follows a path of travel slightly closer to the groove 164. With such a construction, the gauging fingers 175 are held in a normal retracted position away from the tube H while the annular housing 141 carries them back and forth along the tube during all of its return stroke and for a portion of its forward stroke.

At one point in the forward stroke travel of the housing 141, the cam section 188 shifts the sleeves 183 slightly forward on the long rods 149, i. e., at an accelerated rate of speed over that of the advancing long rods. This swings the gauging fingers 175 inwardly into a gauging position against the moving tube H (Fig. 12).

At the time the gauging fingers 175 engage the tube H the cam rollers 163, 186 are at positions in the cam grooves 164 and 187 shown at the top of the cam 165 in Fig. 11. In such a position both cam grooves are relieved, as at 189, and these relieved sections momentarily release the cam control over the advancing housing 141 and the parts moving forwardly.

At such a time the tube H, still moving ahead at the usual speed, engages the hooks 178 of the gauging fingers, at the slits C, D adjacent the hooks. This engagement picks up the housing 141 and its associated parts and carries them forward with the tube, the propelling force being that of the moving tube itself.

This insures that the gauge fingers 175 locate the slits C and D and their associated uncut portions E, F and G, in proper relation to the shearing blades 135 of the housing 141 and the shearing blocks 137 of the internal head 136 preparatory to the cutting operation. The separation of the can body J from the tube H takes place during the time the tube is pushing the annular housing 141 and its associated parts forward.

This cutting action is brought about by the inward movement of the shearing blades 135 against the shearing blocks 137 and is effected through cam action. For this purpose the shear blades 135 are mounted in a pair of vertically disposed slide blocks 192 (Figs. 2, 11 and 13) which operate in vertical slideways 193 formed in the annular housing 141.

The outer ends of the slide blocks 192 are formed with T-shaped tongues 195 which are engaged in and are horizontally slidable along ways 196 formed in horizontal shelf members 197 of a pair of brackets 198. This construction permits of reciprocatory motion of the slide blocks 192 with the annular housing 141 along the path of travel of the tube H as well as movement toward and away from the tube.

There is one bracket 198 for each shear blade 135 and the two brackets are movable vertically in slideway members 199 which are bolted to extensions 201 formed in the machine frame 21. The brackets 198 carry cam rollers 203 which operate in cam grooves 204 of a pair of face cams 205 mounted on the inner ends of a pair of short cam shafts 206 journaled in bearings 207 formed in the machine frame 21.

The outer ends of the cam shafts 206 carry bevel gears 208 which mesh with similar gears 209 mounted on a vertical drive shaft 211. The drive shaft 211 is journaled in a set of three spaced bearings 212 formed on the frame 21. The lower end of the shaft carries a bevel gear 213 which meshes with and is driven by a bevel gear 214 mounted on the continuously rotating main drive shaft 43.

It is through this train of slides, cams, gears, and shafts that the shear blades 135 are reciprocated toward and away from the tube H while being simultaneously reciprocated longitudinally of the horn 91, as hereinbefore mentioned. This inward movement of the shear blades 135 cuts through the uncut portions E, F and G of the tube H which are the only means of holding the can body J integrally with the tube and this cutting action completes the separation of the can body from the tube and results in the individual can body J.

As soon as the separation of a can body J from the tube H has been effected, the cam 165 again takes control of the forward movement of the annular housing 141 and its associated parts and continues their forward movement for the remainder of the stroke. During this remaining portion of the stroke the gauge fingers 175 are moved away from the tube H into their normal retracted position.

The annular housing 141 and the shear head 136 thereupon return along the tube to a position adjacent the next set of slits C, D and uncut portions E, F and G in readiness for the next forward stroke to cut off the next body in line in the tube. This completes the cycle of operations of the machine.

It is thought that the invention and many of its attendant advantages will be understood from the foregoing description, and it will be apparent that various changes may be made in the steps of the method described and their order of accomplishment, as well as in the form, construction and arrangement of the machine parts without departing from the spirit and scope of the invention or sacrificing all of its material advantages, the method and machine hereinbefore described being merely a preferred embodiment thereof.

I claim:

1. The method of making tubular can bodies from a strip of sheet metal moving in the direction of its longitudinal axis, the strip being of a width substantially that of the circumferential dimension of the can body and of a length sufficient to form a plurality of can bodies, which comprises cutting a plurality of spaced aligned slits through the continuously moving strip on a line transverse to the longitudinal axis of the strip to leave aligned uncut portions at the ends of the line at opposite margins of the strip, successively similarly cutting spaced aligned slits through the continuously moving strip on other transverse lines spaced longitudinally of the strip at intervals equal to the length of a single can body, progressively forming the continuously moving strip into an elongated tube with the uncut longitudinal strip margins disposed in engaged relation, continuously securing together the uncut engaged margins of the continuously moving strip to form a side seam in the tube, and finally projecting cutting elements at substantially only the unsevered portions of each successively presented forward slitted circumferential line of the continuously moving seamed tube to cut through all of such portions and produce unitary separate can bodies therefrom.

2. The method of making tubular can bodies from a strip of sheet metal continuously moving in the direction of its longitudinal axis, the strip being of a width substantially that of the circumferential dimension of the can body and of a length sufficient to form a plurality of can bodies, which comprises simultaneously cutting through the continuously moving strip a series of slits on a line transverse to the longitudinal axis of the strip, the slits being in spaced linear relation to leave uncut portions therebetween an uncut portions at the ends of the line at opposite margins of the strip, successively similarly cutting the continuously moving strip on other transverse lines spaced longitudinally of the strip at intervals equal to the length of a single can body, progressively forming the continuously moving strip into an elongated tube with the longitudinal strip margins uncut and disposed in overlapping relation, continuously welding together the uncut engaged margins of the continuously moving strip to form a lapped side seam in the tube, and finally projecting cutting elements at substantially only the unsevered portions of each successively presented forward slitted circumferential line of the continuously moving welded tube to cut through all of such portions and produce unitary separate can bodies therefrom.

3. The method of making tubular can bodies from a strip of sheet metal continuously moving in the direction of its longitudinal axis, the strip being of a width substantially that of the circumferential dimension of the can body and of a length sufficient to form a plurality of can bodies, which comprises simultaneously cutting through the continuously moving strip a series of slits on a line transverse to the longitudinal axis of the strip, the slits being spaced to leave uncut portions therebetween and uncut portions at the ends of the line at opposite margins of the strip, successively similarly cutting the continuously moving strip on other transverse lines spaced longitudinally of the strip at intervals equal to the length of a single can body, progressively forming the continuously moving strip into an elongated tube with uncut portions of each transverse slitted line disposed in diametrically opposed relation and with the uncut longitudinal strip margins disposed in engaged relation, continuously metallically bonding together the uncut engaged margins of the continuously moving strip to form a side seam in the tube, and finally projecting cutting elements at substantially only the unsevered portions of each successively presented forward slitted circumferential line of the continuously moving metallically bonded tube to cut through all of such portions and produce unitary separate can bodies from the tube.

4. A machine for making tubular can bodies from a strip of sheet metal moving in the direction of its longitudinal axis, said strip being of a width substantially that of the circumferential dimension of the can body and of a length sufficient to form a plurality of can bodies, comprising means for continuously advancing the strip along a predetermined path of travel, means for cutting a plurality of slits through the continuously moving strip on a line transverse to the longitudinal strip axis to leave uncut portions at the ends of the line at opposite margins of the strip, means controlling actuation of the cutting means so that it successively similarly cuts the continuously moving strip on other transverse lines spaced longitudinally of the strip at intervals equal to the length of a single can body, means adjacent said strip for progressively forming the continuously moving strip into an elongated tube with the uncut longitudinal strip margins disposed in engaged relation, means for continuously securing together the uncut engaged margins of the moving strip to form a side seam in the tube, cutting elements, and means for projecting the cutting elements at substantially only the unsevered portions of each successively presented forward slitted circumferential line of the continuously moving seamed tube to cut through all of such portions and produce unitary separate can bodies therefrom.

5. A machine for making tubular can bodies from a strip of sheet metal moving in the direction of its longitudinal axis, said strip being of a width substantially that of the circumferential dimension of the can body and of a length sufficient to form a plurality of can bodies, comprising cooperating feed rolls for continuously advancing the strip along a predetermined path of travel, a bracket with means for moving it forward and backward along the longitudinal axis of the strip, slitting means carried by said movable bracket and operable on its forward travel for cutting a plurality of slits through the continuously moving strip on a line transverse to the longitudinal strip axis to leave uncut portions at the transverse line ends at opposite margins of the strip, means controlling actuation of the slitting means so that it successively similarly cuts the continuously moving strip on other transverse lines spaced longitudinally of the strip at intervals equal to the length of a single can body, roller means adjacent said strip for progressively forming the continuously moving strip into an elongated tube with the uncut longitudinal strip margins in engaged relation, means for continuously securing together the uncut engaged margins of the continuously moving strip to form a side seam in the tube, cutting elements, and means having bodily forward and backward movement along the longitudinal axis of the tube and operable on its forward travel for projecting the cutting elements at substantially only the unsevered portions of each successively presented forward slitted circumferential line of the continuously moving seamed tube to cut through all of such portions and produce unitary separate can bodies therefrom.

6. A machine for making tubular can bodies from a strip of sheet metal moving in the direction of its longitudinal axis, said strip being of a width substantially that of the circumferential dimension of the can body and of a length sufficient to form a plurality of can bodies, comprising cooperating feed rolls for continuously advancing the strip along a predetermined path of travel, a bracket located adjacent said feed rolls having means for moving it forward and backward along the longitudinal axis of the strip, a vertically reciprocable slitting head carried by said bracket, slitting elements supported on said head, means to reciprocate the head on the forward travel of said bracket for cutting a plurality of slits through the continuously moving strip on a line transverse to the longitudinal strip axis to leave uncut portions at the transverse line ends at opposite margins of the strip and for successively similarly cutting the continuously moving strip on other transverse lines spaced longitudinally of the strip at intervals equal to the length of a single can body, roller means mounted on the two sides of said strip for progressively forming the continuously moving strip into an elongated tube with the uncut longitudinal strip margins in overlapped relation, means for continuously welding together the uncut overlapped margins of the continuously moving strip to form a side seam in the tube, a reciprocable carriage, and means for moving the carriage forward and backward along the longitudinal axis of the tube, radially reciprocable cutter blades carried by said carriage and means operable on forward travel of the carriage for projecting the cutting blades at substantially only the unsevered portions of each successively presented forward slitted circumferential line of the continuously moving seamed tube to cut through all of such portions and produce unitary separate can bodies therefrom.

7. A machine for making tubular can bodies from a strip of sheet metal moving in the direction of its longitudinal axis, said strip being of a width substantially that of the circumferential dimension of the can body and of a length sufficient to form a plurality of can bodies, comprising means for continuously advancing the strip along a predetermined path of travel, means for cutting a plurality of slits through the continuously moving strip on a line transverse to the longitudinal strip axis to leave uncut portions at the transverse line ends at opposite margins of the strip, means controlling actuation of the cutting means so that it successively similarly cuts the continuously moving strip on other transverse lines spaced longitudinally of the strip at intervals equal to the length of a single can body, means adjacent said strip for progressively forming the continuously moving strip into an elongated tube with the uncut longitudinal strip margins disposed in engaged relation, means for continuously securing together the uncut engaged margins of the moving strip to form a side seam in the tube, cutting elements having forward and backward movement along the longitudinal axis of the tube, gauging means movable with said cutting elements and engageable with the forward end of the tube to locate said cutting elements in severing position relative to the said forward tube end, and means for projecting said cutting elements at substantially only the gauged unsevered portions of each successively presented forward slitted circumferential line of the continuously moving seamed tube to cut through all of such portions and produce unitary separate can bodies from the tube.

JOHN F. PETERS.

REFERENCES CITED

The following references are of record in the file of this patent:

UNITED STATES PATENTS

| Number | Name | Date |
|---|---|---|
| 517,223 | Lee | Mar. 27, 1894 |
| 517,580 | Livingston | Apr. 3, 1894 |
| 565,186 | Taylor | Aug. 4, 1896 |
| 1,952,172 | Knowlton | Mar. 27, 1934 |
| 2,052,380 | Chapman | Aug. 25, 1936 |
| 2,177,104 | Gonser | Oct. 24, 1939 |
| 2,187,740 | Hothersall | Jan. 23, 1940 |
| 2,222,842 | Humphrey | Nov. 26, 1940 |
| 2,345,411 | Moeller | Mar. 28, 1944 |